Figure 1:
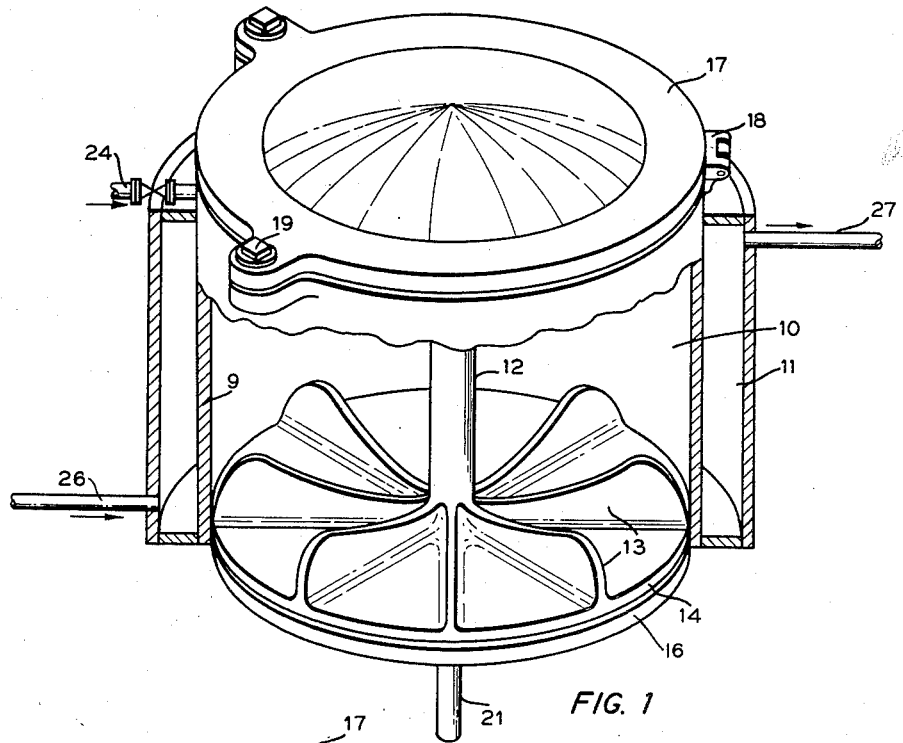

Jan. 1, 1957  J. E. WICKLATZ ET AL  2,776,295
SYNTHETIC RUBBER PASTE LATICES
Filed Oct. 26, 1951

INVENTORS
J.E. WICKLATZ
T.J. KENNEDY
BY
Hudson and Young
ATTORNEYS

United States Patent Office 2,776,295
Patented Jan. 1, 1957

2,776,295
SYNTHETIC RUBBER PASTE LATICES

John E. Wicklatz, Bartlesville, Okla., and Thomas J. Kennedy, Borger, Tex., assignors to Phillips Petroleum Company, a corporation of Delaware Application October 26, 1951, Serial No. 253,342

24 Claims. (Cl. 260—29.7)

This invention relates to the production of synthetic rubber paste latices.

It is well known that synthetic rubber latices can be prepared by polymerization in aqueous emulsion of certain conjugated diene monomers alone or together with other unsaturated organic monomers copolymerizable therewith, employing a fatty acid or rosin type soap as an emulsifier, and that the latices so produced can be coagulated to yield synthetic rubber. In accordance with these methods the aqueous emulsion contains the polymerizable material, together with other ingredients including an emulsifying agent, a modifier, an activator, and the like.

In effecting one form of such an aqueous emulsion polymerization, particularly when a batch-type or semi-batch-type operation is carried out, the reactor is usually first charged with the aqueous medium, which contains the desired emulsifying agent, and the monomeric material is then admixed with agitation of the contents. At the same time a reaction modifier, such as a mercaptan, is also included, usually in solution in at least a part of the monomeric material. An activator solution and an oxidant are separately added to the reaction mixture, and reaction then proceeds. A preferred manner of adding these two constituents is usually to have the activator solution incorporated in the aqueous medium prior to addition of the monomeric material, and to add the oxidant as the last ingredient. Sometimes, however, satisfactory polymerization results can be obtained when this procedure is reversed. Is is also sometimes the practice to add portions of one or the other of the activator solutions and oxidant intermittently, or continuously, during the course of the reaction.

In carrying out such aqueous emulsion polymerization procedures heretofore, the amount of water employed in the recipe has been at least 50 parts by weight per 100 parts by weight of total monomers added, generally not less than about 100 parts and as high as 275 parts or higher, and the latex product has been a liquid. Various methods have been suggested by workers in the art for further treating the latex so formed to concentrate it, among which methods are included creaming and simple vaporization of water from the latex.

Numerous difficulties have been encountered in the past when attempts have been made to produce high solid latices. For example, there has been a marked tendency for the reaction to die before the concentration of solids approaches the requisite level; viscosity of the latex has often been so high as to preclude precise temperature control; and gelation of the latex has frequently occurred.

Synthetic rubber paste latices of the type with which our invention is concerned are advantageously employed in numerous applications, particularly in the production of foam sponge.

Our invention is concerned with the production of synthetic rubber paste latices by an aqueous emulsion polymerization of a monomeric material comprising a conjugated diene, by which we mean to include as the monomeric starting material a conjugated diene alone or such a diene together with an organic monomer copolymerizable therewith.

An object of our invention is to provide for the polymerization in aqueous emulsion of a conjugated diene alone or together with an unsaturated organic monomer copolymerizable therewith, to produce a synthetic rubber paste latex. Another object is to provide for the production of synthetic rubber paste dispersions by direct polymerization of a monomeric material comprising a conjugated diene, in a system in which a continuous aqueous phase is present. Another object is to provide for the copolymerization of 1,3-butadiene with styrene, in aqueous emulsion to produce a butadiene-styrene paste latex. Other objects will be apparent to those skilled in the art from the accompanying discussion and disclosure.

In accordance with our invention we provide for the production of synthetic rubber paste latices by an aqueous emulsion polymerization of a conjugated diene monomer, alone or together with an unsaturated organic monomer copolymerizable therewith, wherein the amount of water employed is from 15 to 40 parts by weight per 100 parts by weight of total monomer added to the polymerization zone. The synthetic rubber paste latices of our invention are produced by direct polymerization in a system in which a continuous aqueous phase is present. Our latex paste product contains at least 70 percent rubbery solids, has excellent mechanical stability, and may be readily diluted with water and/or one or more additional rubber latices to produce a resulting latex containing solids in any desired concentration. Synthetic rubber pastes containing water as a discontinuous phase are not dispersible in additional quantities of water to form a more dilute latex.

We prepare the rubber dispersions of our invention, i. e., the synthetic rubber paste latices, by means of emulsion polymerization in accordance with any recipe employing an emulsifier and operating preferably on the alkaline side, except that we employ a much lower concentration of water in the polymerization system than has been employed heretofore. We prefer generally to employ highly activated polymerization systems such as iron pyrophosphate-hydroperoxide, diazoether, and similar systems which are known to have pronounced activating effects on the polymerization of conjugated diolefins and on the copolymerization of conjugated diolefins with styrene and with other copolymerizable materials. A much smaller quantity of aqueous phase is used in the practice of our invention than is employed in conventional polymerization recipes, the amount of water in any case not exceeding 40 parts per 100 parts of total monomers added to the polymerization system and preferably ranging from 15 to 40 parts per 100 parts of total added monomers, depending largely upon the type and quantity of emulsifier employed and the polymerization temperature desired. It is an important feature of our invention that a continuous aqueous phase is maintained throughout the polymerization period.

Figure 2:
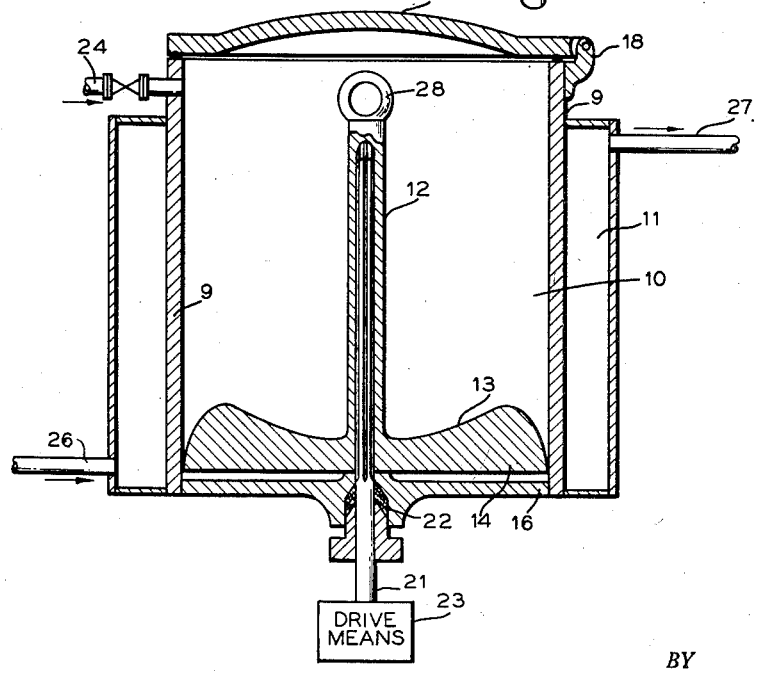

One form of apparatus and method for carrying out the process of our invention is illustrated with reference to Figures 1 and 2 of the attached drawings. Figure 1 is a perspective view of one form of reactor particularly suitable for carrying out the process of our invention. Figure 2 is illustrative of a cross section of the apparatus of Figure 1.

Wtih reference to Figure 1, cylindrical polymerization chamber 10, formed by cylindrical wall 9, is surrounded by water jacket 11, and contains shaft 12 axially disposed therein and rigidly attached at its lower end to upwardly extending vanes 13 above and adjacent plate 14, the latter disposed immediately above bottom closure member 16 of chamber 10, and nearly closing chamber 10. Top closure member 17 of chamber 10 is supported by hinge means 18 and is adapted to be secured to the top of chamber 10 by fastening means 19, and to close chamber 10 so as to make it pressure tight.

Vanes 13 are disposed so as to effect a kneading action on the reaction mixture when shaft 12 is rotated. Spline shaft 21 extending axially into chamber 10 through bottom closure member 16 and packed section 22 (see Figure 2), is adapted to engage shaft 12 to rotate same, either in one continuous direction or alternately as desired. Spline shaft 12 is rotatably driven by external driving means 23, which can comprise any suitable driving means, generally an electric motor.

In carrying out our process in the apparatus described, the polymerization ingredients can be introduced into chamber 10 in any desired manner, such as has already been discussed hereinabove. In one embodiment, chamber 10 is purged with a vaporous diene reactant, and then closed, and the polymerization ingredients are then admitted at the desired temperature through inlet means 24. Spline shaft 21 is rotated by drive means 23 at a predetermined rate thereby driving shaft 12 and vanes 13 and providing the desired amount of agitation and kneading in chamber 10 during the polymerization period. Temperature control in chamber 10 is effected by passing heat transfer liquid into jacket 11, through line 26 and withdrawing same through line 27. In this manner the reaction is initiated at the desired temperature level and the excess exothermic heat generated in chamber 10 is continuously removed from the polymerization system in the fluid withdrawn from jacket 11 through line 27.

At the end of the polymerization period top closure member 17 is disengaged from fastening means 19 and is moved on hinge means 18 to provide for removal of the resulting paste latex from chamber 10. Removal of the total paste latex product from chamber 10 can be effected by engaging shaft 12 at ring 28 (see Figure 2) to raise shaft 12, thereby raising vane-plate 13—14 and forcing the latex product from chamber 10 through the open top end as a single cylindrical shaped paste body.

Polymerization temperatures employed in the practice of our invention may range from —40 to 70° C. When temperatures below the freezing point of the aqueous phase are employed, antifreeze agents such as methanol, glycerol, and the like are included in the system, as discussed hereafter. Similarly, such antifreeze agents when necessary are employed in the cooling liquid passed through jacket 11.

In order to produce our synthetic paste latices, conversions of total monomer are generally not lower than 80 percent and are more often 90 percent or higher.

In one embodiment of our invention, a multiplicity of reactors is employed, one series to produce rubber paste dispersions and another series to produce liquid dispersions. By suitable blending of any two or more of the products of the various reactors, final production of a latex of any desired solids content can be readily obtained.

Stable rubber paste dispersions are produced in the practice of our invention which can be easily shipped and stored, and subsequently diluted with water or other rubber latices to form products having any desired solids content. With respect to storage and shipping, the reaction mixture, incompletely polymerized, can be stored in shipping drums, or other appropriate vessels and the polymerization can be completed in storage or in transit as the case may be.

One method by which the ingredients of the aqueous emulsion polymerization system can be charged to the polymerization chamber in the practice of our invention is described in more detail in the copending application of A. C. Rothlisberger and C. A. Uraneck, Serial No. 253,444, filed October 26, 1951, wherein is described a procedure for the formation of the emulsifier in situ. In applying one embodiment of the procedure described in that copending application to the practice of our invention, for example, as applied to the copolymerization of butadiene and styrene employing an activator and an oxidant, we introduce water into the reactor together with fatty acid, styrene, mercaptan and butadiene while agitating the mixture until the fatty acid and mercaptan are dissolved in the monomer phase. Potassium hydroxide is then introduced into the system to neutralize the fatty acid and to render the pH of the system on the alkaline side. Thereafter, the activator and the oxidant are introduced into the system and the mixture is agitated during the remainder of the polymerization period.

In other embodiments of our invention the requisite ingredients can be introduced into the polymerization system simultaneously, or in any desired order.

The monomeric material polymerized to produce paste latices by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, cyano, carboxy, or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like, aryl olefins such as styrene, various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinyl acetate, vinyl chloride, vinylidene chloride, vinylfurane, vinylcarbazole, vinylacetylene and other unsaturated hydrocarbons, esters, alcohols, acids, ethers, etc., of the types described.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants.

It is frequently desirable to include water-soluble components in the aqueous phase, particularly when the polymerization temperatures are below freezing. Inorganic salts and alcohols can be so used. Alcohols which are applicable, when operating at low temperatures, comprise water-soluble compounds of both the monohydric and polyhydric types, and include methyl alcohol, ethylene glycol, glycerine, erythritol, and the like. The amount of alcoholic ingredient used in a polymerization recipe must be sufficient to prevent freezing of the aqueous phase.

The total pressure on the reactants is preferably at least as great as the total vapor pressure of the mixture, so that the initial reactants will be present in liquid phase.

Emulsifying agents which are applicable in the practice of our invention are fatty acid soaps such as potassium laurate, potassium oleate, and the like. Salts of rosin acids and other emulsifying agents such as nonionic emulsifying agents, e. g., salts of alkyl aromatic sulfonic acids, salts of alkyl sulfates, and the like, which will produce favorable results under the conditions of the reaction, can also be used. The amount of emulsifier used to obtain optimum results is somewhat dependent upon the relative amounts of monomeric material and aqueous phase, the reaction temperature, and the other ingredients of the polymerization mixture. Usually an amount between about 0.3 and 5 parts per 100 parts of monomeric material will be found to be sufficient.

The pH of the aqueous phase may be varied over a rather wide range without producing deleterious effects on the conversion rate or the properties of the polymer. In general the pH can be within the range of 9 to 12, with the narrower range of 9.5 to 10.5 being most generally preferred, except when a polyamino compound is used as a reductant, in which case a somewhat higher pH is generally preferred.

Preferred polymerization modifiers are alkyl mercaptans, and these may be of primary, secondary, or tertiary configuration, and generally range from $C_8$ to $C_{16}$ compounds, but may have more or fewer carbon atoms per molecule. Mixtures or blends of mercaptans are also frequently considered desirable and in many cases are preferred to the pure compounds. The amount of mercaptan employed will vary, depending upon the particular compound or blend chosen, the operating temperature, the freezing point depressant employed, and the results desired. In general, the greater modification is obtained when operating at low temperatures and therefore a smaller amount of mercaptan is added to yield a product of a given Mooney value, than is used at higher temperatures. In the case of tertiary mercaptans, such as tertiary $C_{12}$ mercaptans, blends of tertiary $C_{12}$, $C_{14}$, and $C_{16}$ mercaptans, and the like, satisfactory modification is obtained with 0.05 to 0.3 part mercaptan per 100 parts monomers, but smaller or larger amounts may be employed in some instances. In fact, amounts as large as 2.0 parts per 100 parts of monomers may be used. Thus, the amount of mercaptan is adjusted to suit the case at hand.

The following recipes are given as examples of some of the types of polymerization recipes that can be used in accordance with known processes for formation of latices which may be coagulated to yield synthetic rubber, and are presented as being typical of those to which our invention is applied.

RECIPE

| Persulfate | Diazothioether | Iron Pyrophosphate (Redox) | Polyalkylene Polyamine |
|---|---|---|---|
| Conjugated monomeric diene.[1] Water. $K_2S_2O_8$. Modifier. Emulsifier. | Conjugated monomeric diene.[1] Water. Modifier (optional). Emulsifier. Diazothioether. | Conjugated monomeric diene.[1] Water. Modifier. Emulsifier. Hydroperoxide. Emulsifier. Sugar (Optional). Alkali-Metal Pyrophosphate. $FeSO_4 \cdot 7H_2O$. | Conjugated monomeric diene.[1] Water. Electrolyte (Optional). Alkali-Metal Hydroxide (Optional). Emulsifier. Modifier. Hydroperoxide. Polyalkylene Polyamine. |

[1] A conjugated diene alone or together with an unsaturated organic material copolymerizable therewith.

Suitable hydroperoxides for use in iron pyrophosphate (redox) and polyalkylene polyamine recipes and other recipes calling for an oxygen-yielding material are preferably organic hydroperoxides having the formula RR'R"COOH wherein each of R, R', and R" is an organic radical, or R'R" together comprise a tetramethylene or pentamethylene group forming with the $$R-\underset{|}{\overset{|}{C}}OOH$$

a cyclopentyl or cyclohexyl hydroperoxide. Each of R, R' and R" can be completely hydrocarbon in character, and can be of mixed character, such as aralkyl, alkaryl, and the like, and can also have non-hydrocarbon substituents, some of which will have the effect of making them more water-soluble and less oil (hydrocarbon)-soluble; particularly useful non-hydrocarbon substituents include oxygen in the form of hydroxy and ether compounds, sulfur in similar compounds (i. e., mercapto compounds and thioethers), and halogen compounds. Examples of such hydroperoxides include diisopropyl hydroperoxide (isopropyl (dimethyl) hydroperoxymethane), cumene hydroperoxide (phenyl(dimethyl)hydroperoxymethane), 1-methyl-1-hydroperoxycyclopentane, tetralin hydroperoxide, phenylcyclohexane hydroperoxide, octahydrophenanthrene hydroperoxide, diisopropylbenzene hydroperoxide (dimethyl(isopropylphenyl)hydroperoxymethane), methylethyl (ethoxyphenyl) hydroperoxymethane, methyldecyl (methylphenyl) hydroperoxymethane, dimethyldecylhydroperoxymethane, methylchlorophenylphenylhydroperoxymethane, and tertiarybutylisopropylbenzene hydroperoxide (dimethyl(tertiarybutylphenyl)hydroperoxymethane).

The amount of hydroperoxide used to obtain an optimum reaction rate will depend upon the other reaction conditions, and particularly upon the type of polymerization recipe used. The amount is generally expressed in millimols per 100 parts of monomeric material, using in each instance the same units of weight throughout, i. e. when the monomeric material is measured in pounds the hydroperoxide is measured in millipound mols. The same is true for other ingredients of the polymerization recipe. An optimum rate of polymerization is usually obtained with the amount of hydroperoxide between 0.1 and 10 millimols per 100 parts by weight of monomeric material. The hydroperoxide can frequently be easily separated from accompanying materials by converting it to a corresponding salt of an alkali metal, which is usually a crystalline material in a pure or concentrated state at atmospheric temperatures, and separating the salt. This salt can be used as an active form of the hydroperoxide.

In the case of a diazothioether recipe, preferably diazothioethers have the formula R—N=N—S—R' where R and R' are aromatic groups containing substituents such as alkyl, chloro, nitro, methoxy, sulfonic acid group, and R' can also be cycloalkyl, substituted cycloalkyl, aliphatic, substituted aliphatic, and the like. These compounds act both as initiators and as modifiers in a polymerization recipe and hence may be used as both catalysts and modifiers in the recipe. However, it is preferred to use a modifier of the type noted above along with the diazothioether in the practice of my invention. In certain instances, it may also be desirable to use a catalyst such as potassium or sodium ferricyanide in conjunction with the diazothioether. Examples of suitable diazothioethers include 2-(2,4-dimethyl-benzenediazomercapto)-naphthalene, 2-(4-methoxybenzenediazomercapto)-naphthalene (known in the art as MDN), 2-(2-methylbenzenediazomercapto)naphthalene, 2-(2,5-dimethoxybenzenediazomercapto)naphthalene, 4-(2,5-dimethoxybenzenediazomercapto) toluene, 4-(2-naphthalenediazomercapto)anisole, 2-(4-acetylaminobenzenediazomercapto)naphthalene, 2-(benzenediazomercapto)naphthalene, 2-(4-sulfobenzenediazomercapto)benzothiazole, 2-(1-naphthalenediazomercapto)naphthalene, 2-(4-chlorobenzenediazomercapto)naphthalene, 2-(5-quinolinediazomercapto)naphthalene, 2-(4-nitrobenzenediazomercapto)naphthalene, and the like.

The type and amount of diazothioether used in a particular polymerization recipe depends upon the result desired. In general, approximately 0.2 part by weight of diazothioether per 100 parts of butadiene will give satisfactory promotion of the polymerization reaction although other proportions within the range of about 0.5 to about 5.0 parts by weight per 100 parts by weight of butadiene, can be used. The diazothioether can be added in increments throughout the polymerization reaction in order to provide more uniform modification and to obtain more efficient utilization of the diazothioether. If the diazothioether is the only modifying agent present, somewhat larger quantities are needed than is the case if other modifiers are used in conjunction therewith.

In the case of a polyalkylene polyamine recipe, the activating agent, i. e., a polyalkylene polyamine is preferably a polyethylene polyamine or a trimethylene polyamine. Suitable polyethylene polyamines have the general formula $RNH(CHXCHXNH)_m(CHXCHX)_nNHR$, where R contains not more than eight carbon atoms and is of the group consisting of hydrogen, alkyl, cycloalkyl, aromatic, olefinic, and cycloolefinic radicals, each X contains not more than three carbon atoms and is of the group consisting of hydrogen and aliphatic radicals, $m$ is an integer between 0 and 8, inclusive, and $n$ is an integer of the group consisting of 0 and 1 and is 1 when $m$ is greater than 0. Each of the foregoing radicals (other than hydrogen) can be completely hydrocarbon in character, and R can be of mixed character when containing six or more carbon atoms, such as alkylcycloalkyl, aralkyl, alkaryl groups, and the like, and both R and X can also have non-hydrocarbon substituents; particularly useful non-hydrocarbon constituents include oxygen in the form of hydroxy and ether compounds, sulfur in similar compounds (i. e., mercapto compounds and thioethers), and halogen compounds. Examples of polyethylene polyamines which are applicable include ethylenediamine, hydrazine, diethylenetriamine, tetraethylenepentamine, di(methylethylene)triamine, N-(2-hydroxy-ethyl)-1,2-ethanediamine, N-phenylethylenediamine, N - cyclohexyl - N' - (2 - aminoethyl) - 1,2 - ethanediamine, N-(2-hydroxy-tert-butyl)-1,2-propanediamine, carbamates of the foregoing, and the like.

Suitable trimethylene polyamines are preferably those having the general formula

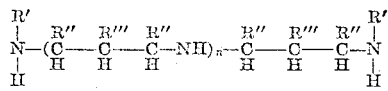

where each R' is one of the group consisting of hydrogen, methyl, ethyl, hydroxymethyl, hydroxyethyl, and carboxy radicals, each R'' is hydrogen or methyl, and each R''' is hydrogen, methyl, or an activating substituent of the group consisting of —OR, —SR, —NR$_2$, —CN, —SCN, —COOR, —CHO, with R being hydrogen, methyl, ethyl, n-propyl, or isopropyl, or —CHR''' can be >C=O, and $n$ is an integer between 0 and 8 inclusive. The compounds containing a single trimethylene group together with its two terminal amine groups is preferred. The simplest of these trimethylene polyamines, or 1,3-diaminopropanes, is 1,3-diaminopropane itself. This compound is also known as trimethylenediamine. Substitution of an —OH or a =O on the central carbon atom of 1,3-diaminopropane appears to enhance the activity in the emulsion polymerization recipes, hence 1,3-diaminoacetone and 1,3-diamino-2-propanol are at present the most preferred 1,3-diaminopropanes. Other 1,3-diaminopropanes, which contain a plurality of trimethylene (unsubstituted or substituted) groups alternating with amino groups, and which are regarded as polymers of the parent compound, can also be employed; for example, tri(trimethylene)tetramine (sometimes erroneously designated as tripropylenetetramine) is considered to be a polymer of trimethylenediamine. All of the polyamino compounds referred to above have the basic structure of 1,3-diaminopropane and hence can be broadly referred to as "1,3-diaminopropane and its derivatives and polymers thereof"; they can also be broadly referred to as "1,3-diaminopropanes" and also as "trimethylene polyamines." It is preferred to use only those polyamines which come within the structural formula defined hereinabove, and all of the compounds so defined are operable in our process to some extent though it will be of course appreciated that the relative activities and efficacies will vary considerably depending upon the size of the molecule and the various constituents thereof, as well as upon the other components and their proportions in the various recipes which may be used. Those skilled in the art will readily ascertain any of the specific compounds which are within the scope of the structural formula. However, by way of example, the following are mentioned: 1,3-diaminopropane, 1,3-diaminoacetone, 1,3-diamino-2-propanol, N,N'-dimethyl-1,3 - diaminoacetone, N-ethoxy-1,3-diamino-2-propanol, 1,3-diamino-2-carboxypropane, 1,3-diamino-2-(dimethylamino)-propane, 2,4-diaminopentane, 1,3-diamino-2-cyanopropane, 1,3-diamino-2-mercaptopropane, di(trimethylene)triamine, tri(trimethylene)tetramine, tetra-(trimethylene)pentamine, polytrimethylene polyamines in which the amino and trimethylene groups can be substituted as previously mentioned, and carbamates of each of the foregoing.

These polyalkylene polyamine activator compositions appear to serve as reductants and/or activators in the polymerization mixture, and no other activating ingredients, such as compounds of polyvalent-multivalent metals, need be added in order to obtain satisfactory and rapid polymerization of the butadiene, except as such compounds may fortuitously be present as traces in the polymerization mixture. Similarly, no other reducing ingredient, such as a reducing sugar, need be added.

The amount of polyalkylene polyamine to be used in any particular case depends upon such variables as the polyamine used, specific ingredients of recipe, and conditions of reaction. In general, amounts of polyalkylene polyamine in the range of 0.1 to 2 parts of polyalkylene polyamine per 100 parts of butadiene will give satisfactory results; however, greater or smaller amounts of polyamine can be used.

The above recipes can be varied widely in the particular combination of ingredients and in their relative proportions except that in the practice of our invention, only from 15 to 40 parts of water per hundred parts of total added monomer, is employed.

The advantages of this invention are illustrated by the following examples. The reactants and their proportions and their specific ingredients are presented as being typical and should not be construed to limit the invention unduly.

*Example I*

The preparation of a latex paste was effected at 5° C. using the following polymerization recipe:

| | Parts by weight |
|---|---|
| Butadiene | 70 |
| Styrene | 30 |
| Water | 25 |
| Potassium laurate or potassium myristate | 5 |
| Mercaptan blend[1] | 0.30 |
| Tert-butylisopropylbenzene hydroperoxide | 0.26 |
| FeSO$_4$.7H$_2$O | 0.20 |
| K$_4$P$_2$O$_7$ | 0.25 |

[1] A blend of tertiary C$_{12}$, C$_{14}$ and C$_{16}$ aliphatic mercaptans in a ratio of 3 : 1 : 1 parts by weight.

Water, fatty acid, styrene, mercaptan blend, and butadiene were charged to a reactor of the type illustrated in the drawings, and agitated until the fatty acid and mercaptan were dissolved in the monomer phase. (A sufficient amount of water was withheld for preparation of the KOH and activator solutions.) Potassium hydroxide solution was then introduced in an amount required to give 95 percent neutralization of the fatty acid (pH of the system was approximately 10.3). The mixture was agitated for about 30 minutes during which time the temperature was adjusted to 5° C. The hydroperoxide, dissolved in about 20 percent of the styrene which was withheld for this purpose, was introduced followed by addition of the ferrous pyrophosphate activator solution. The activator solution was previously prepared by dissolving the ingredients separately in water, pouring the ferrous sulfate into the pyrophosphate, and heating the mixture at 60° C. for 40 minutes.

A latex paste was obtained at a total monomer conversion level of 92 percent, with each emulsifier after a reaction period of 48 hours. At the end of this time the resulting reaction mixture was allowed to stand at room temperature for 24 hours. The paste consistency after this time increased, and the final paste had a solids content of 76 weight percent and had excellent mechanical stability.

A sample of the final latex paste prepared in the above described manner was readily diluted with water to give a 55 percent solids latex that was viscous but could be poured.

Another sample of the latex paste was mixed with a 53 percent solids latex (a 70/30 butadiene-styrene latex prepared at 5° C.) until a 57 percent solids latex was obtained. This latex blend was fluid and had good mechanical stability.

*Example II*

A run was made in a jacketed 5 gallon reactor of the type illustrated in the attached drawings, to produce a latex paste in accordance with the following recipe:

| | Parts by weight |
|---|---|
| Water | 25 |
| Butadiene | 70 |
| Styrene | 30 |
| Oleic acid | 4.64 |
| KOH | 0.876 |
| Tert-butylisopropylbenzene hydroperoxide | 0.229 |
| K$_4$P$_2$O$_7$ | 0.330 |
| FeSO$_4$.7H$_2$O | 0.280 |
| Mercaptan blend [1] | 0.10 |

[1] As in Example I.

Temperature conditions and the charging procedure of Example I were employed. The concentration of solids in the polymerization reaction mixture reached about 28 weight percent after 18 hours. Agitation was then discontinued. Five hours later the flow of coolant was shut off, at which time the said concentration of solids had increased to about 35 weight percent. The reaction mixture was then permitted to stand for 10 hours during which time the batch temperature increased to room temperature (25° C.). The latex product at the end of the total period, 33 hours, was a paste containing 73 weight percent solids.

In carrying out one of our preferred embodiments of this invention, we employ a reaction temperature below 20° C., and a reactor assembly of the type described above with reference to the drawings and in the manner illustrated in foregoing example, we control the polymerization temperature at the predetermined level, while continuously agitating the aqueous emulsion reaction mixture for a period of from ten to thirty hours, during which period a latex is formed containing from about 20 to 40 weight percent solids. Agitation is then stopped and circulation of cooling fluid is continued for a period of from 10 to 20 hours during which time the solids content of the latex increases as a result of further polymerization, to a level of from 25 to 50 weight percent. Circulation of cooling fluid is then terminated and the reaction mixture is permitted to stand for an additional 5 to 30 hours during which time polymerization continues. It is then recovered as a product of the process. During the final period, the polymerization temperature approaches or approximates the temperature of the surrounding atmosphere, often room temperature of about 25° C. In this latter instance a substantial portion of the final polymerization proceeds at room temperature.

*Example III*

A series of runs was made at 5° C. using the recipe and charging procedure of Example I except that variable quantities of potassium laurate or potassium oleate were used as emulsifiers (either 5, 4, or 3 parts). After a 48-hour polymerization period, a paste latex product containing approximately 70 percent solids was obtained in each case. After standing at room temperature for 24 hours, further reaction occurred and the solids content increased to 76 percent.

The above prepared pastes were diluted with water to 60, 55, and 50 percent solids to give fluid latices. Fluid latices containing 61 percent solids were produced by mixing equal parts of the latex paste (made with either 3 or 5 parts potassium oleate) with a sample of 53 percent solids latex (see Example I) and adding 2 parts potassium chloride per 100 parts of the latices. Viscous fluid latices containing 64 percent solids were obtained in a similar manner by mixing latices in the required proportions and adding 4 parts potassium chloride per 100 parts of the latices.

*Example IV*

A latex paste was prepared at 5° C. using the following recipe:

| | Parts by weight |
|---|---|
| Butadiene | 70 |
| Styrene | 30 |
| Water | 30 |
| Potassium oleate | 0.75 |
| Triton X-155 [1] | 3.0 |
| Tert-butylisopropylbenzene hydroperoxide | 0.188 |
| Mercaptan blend [2] | 0.3 |
| FeSO$_4$.7H$_2$O | 0.21 |
| K$_4$P$_2$O$_7$ | 0.266 |

[1] Dimeric alkylated aryl polyether alcohol.
[2] As in Example I.

The potassium oleate and Triton X-155 were dissolved in water and charged to the reactor, the hydroperoxide was then added followed by a solution of the mercaptan in styrene. Butadiene was then introduced, the temperature was adjusted to 5° C., and the activator was added. The latex paste formed had excellent mechanical stability. It is easily diluted with water or a latex of lower solids content.

*Example V*

A polymerization run was made at 50° C. using the following recipe:

| | Parts by weight |
|---|---|
| Butadiene | 70 |
| Styrene | 30 |
| Water | 25 |
| 2-(4-methoxybenzenediazomercapto)naphthalene | 1.5 |
| Fatty acid soap, Na salt | 5.0 |
| NaOH | 0.5 |

The reaction reached 89 percent conversion in 52 hours. The product was a latex paste containing 73.5 percent solids after removal of unreacted monomers.

*Example VI*

A paste latex was prepared in accordance with the following polymerization recipe:

|                                                    | Parts by weight |
|----------------------------------------------------|-----------------|
| Butadiene                                          | 70              |
| Styrene                                            | 30              |
| Water                                              | 25              |
| Oleic acid [1]                                     | 4.64            |
| Cumene hydroperoxide                               | 0.167           |
| $FeSO_4.7H_2O$                                     | 0.280           |
| $K_4P_2O_7$                                        | 0.330           |
| KOH, for neutralization of oleic acid              | 0.875           |
| Mercaptan blend [2]                                | 0.10            |

[1] Emersol 233.
[2] A blend of tertiary $C_{12}$, $C_{14}$, and $C_{16}$ aliphatic mercaptans in a ratio of 3 : 1 : 1 parts by weight.

Polymerization was effected at 5° C., using the conventional technique, until a 30 percent solids content was reached. Agitation was discontinued and the reaction mixture maintained at a temperature of 5° C. for an additional eight hours. The paste was then discharged from the reactor and allowed to stand at room temperature. The solids content increased to 71 percent. The rubber had a Mooney value of 110.

The latex paste appeared as described above, was divided into three portions. The first portion (sample 1) was diluted with water to give a latex containing approximately 30 percent solids, one percent di-tert-butylhydroquinone and one percent phenyl-beta-naphthylamine were added, and the latex was then coagulated by the salt-acid method. The compounding ingredients were added on the mill. The other two portions of the latex paste were stabilized with one percent of di-tert-butylhydroquinone. In sample 2 all the compounding ingredients were worked into the paste and then further mixing was accomplished by sheeting on the mill. The sample was then dried for about two hours in an air oven at 60° C. Sample 3 was treated in a similar manner to sample 2 except that sulfur was not added to latex paste. After drying, sulfur was incorporated on the mill.

The following compounding recipe was employed:

|                                         | Parts by weight |
|-----------------------------------------|-----------------|
| Latex paste *                           | 141             |
| Philblack O, high abrasion furnace black| 25              |
| Zinc oxide                              | 3               |
| Agerite resin D [1]                     | 1               |
| Paraflux [2]                            | 5               |
| Staybelite resin [3]                    | 2.5             |
| Sulfur                                  | 2.5             |
| Santocure [4]                           | 1               |
| A-32 [5]                                | 0.2             |

* In sample 1 the rubber from 141 parts latex paste was employed.
[1] Polymerized trimethyldihydroquinoline.
[2] Saturated polymerized hydrocarbon.
[3] Hydrogenated rosin.
[4] N-cyclohexyl-2-benzothiazole-sulfenamide.
[5] Reaction product of butyraldehyde and butylidene aniline.

The samples were cured 30 minutes at 307° F. and physical properties determined. The results are shown in the table which follows. Evaluation data on a 71/29 butadiene-styrene rubber prepared at 5° C., in accordance with a cumene hydroperoxide activated recipe, employing 180 parts water/100 parts by weight of total monomers charged are included for comparison. This rubber was compounded in accordance with the above compounding recipe except that 1 part of stearic acid was added, and 100 parts of rubber (71/29 butadiene-styrene) was used in place of the 141 parts of latex paste.

The paste latices of our invention can be admixed directly with compounding ingredients, and then dried to provide a compounded rubber, ready for vulcanization. Exemplary of such ingredients are reinforcing pigments such as carbon black, fillers such as zinc oxide, various accelerators, sulfur, and the like, as are well known in the art. Accordingly, we eliminate the coagulating step to recover the polymer in a form which is suitable for compounding, as is required in the case of fluid latices.

Mixing of the compounding ingredients with our paste latices can be effected in any desired manner. For example, the compounding ingredients can be added to the paste latex separately, or mixed together and added as a single admixture; or, any of the compounding ingredients or selected combinations thereof can be added to the paste latex, such as by stirring, and the remaining compounding material added on the mill. Prior to drying the compounded paste latex, which can be generally carried out at 50–75° C., it can be sheeted on the mill. Such a sheeting operation generally provides improved dispersion. Additional milling of the dried material can be carried out if desired, and is considered advantageous in some instances.

The vulcanizates produced from our compounded paste latices have excellent, and in many instances, superior physical characteristics. For example, a vulcanizate produced from a latex paste prepared at 5° C. and compounded by direct addition thereto of the compounding ingredients, was found to be superior in aged tensile strength and flex life to a vulcanizate prepared from another portion of the same paste latex, but the latter latex portion having first been diluted with water and then coagulated by addition thereto of a coagulating agent.

Many modifications of this invention will be apparent to those skilled in the art upon study of the accompanying disclosure. Such modifications, being clearly apparent from this disclosure are believed to be within the spirit and scope of this invention.

We claim:

1. In the production of a synthetic rubber latex by the polymerization in aqueous emulsion of a monomeric material comprising a conjugated diene, the improvement comprising maintaing from 15 to not more than 40 parts by weight of water in said emulsion per 100 parts by weight of said monomeric material charged, whereby a synthetic rubber paste latex is formed, said paste latex having a solids content of at least 70 weight percent and being suitable for vulcanization without requiring process steps for first effecting coagulation of same to produce

UNAGED SAMPLES

| Sample | M. S.—1½ at 212° F. | 80° F. | | | 200° F. Tensile, p. s. i. | ΔT, ° F. | Percent Resilience | Flex Life, M | Shore Hardness | Percent Compression Set |
|---|---|---|---|---|---|---|---|---|---|---|
| | | 300% Modulus, p. s. i. | Tensile, p. s. i. | Percent Elongation | | | | | | |
| 1 | 75.5 | ---- | 1,870 | 280 | 490 | 31.1 | 76.7 | <0.1 | 60 | 9.8 |
| 2 | 62 | 1,650 | 2,500 | 400 | 820 | 43.3 | 54.4 | 3.4 | 60 | 10.7 |
| 3 | 59 | 1,570 | 2,770 | 420 | 760 | 38.1 | 54.8 | 3.4 | 60 | 9.5 |
| 71/29 Butadiene-Styrene | 30.5 | 850 | 3,250 | 590 | 650 | 34.4 | 78.5 | 4.7 | 53 | 11.1 |

OVEN AGED 24 HOURS AT 212° F.

| Sample | M. S.—1½ at 212° F. | 300% Modulus, p. s. i. | Tensile, p. s. i. | Percent Elongation | 200° F. Tensile, p. s. i. | ΔT, ° F. | Percent Resilience | Flex Life, M | Shore Hardness | Percent Compression Set |
|---|---|---|---|---|---|---|---|---|---|---|
| 1 | | | 1,790 | 235 | | 32.1 | 80.0 | <0.1 | 64 | |
| 2 | | 2,070 | 3,020 | 400 | | 47.3 | 59.0 | 2.0 | 67 | |
| 3 | | 2,120 | 2,940 | 385 | | 43.6 | 58.3 | 2.7 | 66 | |
| 71/29 Butadiene-Styrene | | 1,490 | 2,760 | 435 | | 30.4 | 80.0 | 1.2 | 58 | | polymer crumb with subsequent separation and drying of said crumb, and recovering synthetic rubber paste latex thus formed as a product of the process.

2. The improvement of claim 1 wherein said monomeric material comprises a major amount of a conjugated diene and a minor amount of an unsaturated organic monomer copolymerizable therewith and containing the characteristic structure $CH_2=C<$.

3. The improvement of claim 2 wherein said conjugated diene is 1,3-butadiene and said copolymerizable monomer is styrene.

4. The improvement of claim 1 wherein said monomeric material consists of 1,3-butadiene.

5. An improved process for the production of a synthetic rubber paste latex by emulsion polymerization of a monomeric material comprising a major amount of 1,3-butadiene and a minor amount of styrene, which comprises establishing and maintaining at a polymerization temperature between −40 and 70° C. an emulsion of said monomeric material and said emulsifier, in aqueous phase having a pH between 9 and 12 and containing from 15 to not more than 40 parts of water, from 0.3 to 5 parts of an alkali metal soap emulsifying agent, from 0.05 to 2.0 parts of an alkyl mercaptan having between 8 and 16 carbon atoms in the molecule, from 0.1 to 10 millimols of an organic hydroperoxide oxidant, and from 0.1 to 3 millimols of an iron pyrophosphate complex activator, said parts being parts by weight per 100 parts by weight of said monomeric material, whereby a synthetic rubber paste latex is formed, said paste latex having a solids content of at least 70 weight percent and being suitable for vulcanization without requiring process steps for first effecting coagulation of same to produce polymer crumb with subsequent separation and drying of said crumb, and recovering a synthetic rubber paste latex thus formed as a product of the process.

6. An improved process for the production of a synthetic rubber latex, which comprises establishing and maintaining at a polymerization temperature between −40 and 70° C. an emulsion of a monomeric material comprising a major amount of 1,3-butadiene and a minor amount of styrene, having a pH between 9 and 12 and containing from 15 to not more than 40 parts of water, from 0.3 to 5 parts of a fatty acid soap emulsifier, and from 0.5 to 5 parts of a diazothioether, said parts being parts by weight per 100 parts by weight of total butadiene and styrene, introduced into said emulsion, whereby a synthetic rubber paste latex is formed, said paste latex having a solids content of at least 70 weight percent and being suitable for vulcanization without requiring process steps for first effecting coagulation of same to produce polymer crumb with subsequent separation and drying of said crumb, and recovering a synthetic rubber paste latex as a product of the process.

7. In the production of a synthetic rubber latex by the polymerization in aqueous emulsion of a monomeric material comprising a conjugated diene, the improvement comprising maintaining said emulsion in a continuous state of agitation at a pH of from 9 to 12 and containing from 15 to not more than 40 parts of water until a latex paste is formed, discontinuing said agitation prior to completing said polymerization and then permitting said polymerization to continue, whereby the solids content of said paste latex is increased to at least 70 percent, said parts being parts by weight per 100 parts by weight of said monomeric material, and recovering said paste latex of increased solids content as a product of the process.

8. In the production of synthetic rubber latex by the polymerization in aqueous emulsion of a monomeric material comprising a conjugated diene, the improvement comprising maintaining said emulsion at a pH of from 9 to 12 and containing 15 to not more than 40 parts water per 100 parts by weight of said monomeric material, controlling the temperature of said aqueous emulsion at a predetermined level within the limits of 0 and 20° C. and maintaining said temperature for a period of from 10 to 30 hours while continuously agitating said emulsion, whereby a latex is formed containing from 20 to 40 weight percent solids, discontinuing said agitation while maintaining said temperature control for a period of from 10 to 20 hours, whereby the solids content of said latex increases to a level within the limits of 25 and 50 weight percent, terminating said control of temperature and permitting said emulsion to stand for a period of from 5 to 30 hours, whereby said polymerization continues to at least 70 percent solids content, and recovering a paste latex as a product of the process.

9. An improved process for the production of a synthetic rubber paste latex, which comprises maintaining an emulsion of a monomeric material consisting essentially of a major amount of 1,3-butadiene and a minor amount of styrene, in aqueous phase having a pH between 9 and 12 and containing from 15 to not more than 40 parts of water, from 0.3 to 5 parts of an alkali metal soap emulsifier, from 0.05 to 2.0 parts of an alkyl mercaptan having between 8 and 16 carbon atoms in the molecule, from 0.1 to 10 millimols of an organic hydroperoxide oxidant, and from 0.1 to 3 millimols of an alkali metal ferrous pyrophosphate activator, at an average temperature level within the limits of 0 and 20° C. for a period of from 10 to 30 hours while continuously agitating said emulsion and controlling said temperature at a predetermined level in said temperature range, whereby a latex is formed containing from 20 to 40 weight percent of solids, terminating said agitation while maintaining said control for a period of from 10 to 20 hours, whereby the solids content of said latex increases to a level within the limits of 25 and 50 weight percent, terminating said control and permitting said emulsion to stand for a period of from 5 to 30 hours, whereby said polymerization continues to at least 70 percent solids content, said parts being parts by weight per 100 parts by weight of said monomeric material, and recovering a paste latex as a product of the process.

10. The process of claim 9 wherein said emulsion contains 25 parts of water, 70 parts of butadiene, 30 parts of styrene, wherein said oxidant is tert-butylisopropylbenzene hydroperoxide, and wherein said activator is formed from $K_4P_2O_7$ and $FeSO_4 \cdot 7H_2O$ and wherein said mercaptan is a blend of tertiary-$C_{12}$, $C_{14}$ and $C_{16}$ aliphatic mercaptans in a respective weight ratio of 3:1:1.

11. In the production of a synthetic rubber latex by the polymerization in aqueous emulsion of a monomeric material comprising a conjugated diene, in the presence of an emulsifying agent, a modifier, and a polymerization catalyzing agent, the improvement comprising maintaining from 15 to not more than 40 parts by weight of water in said emulsion per 100 parts by weight of said monomeric material charged, whereby a synthetic rubber paste latex is formed, said paste latex having a solids content of at least 70 weight percent and being suitable for vulcanization without requiring process steps for first effecting coagulation of same to produce polymer crumb with subsequent separation and drying of said crumb, and recovering paste latex thus formed as a product of the process.

12. A process for the production of a synthetic rubber vulcanizate, wherein a synthetic rubber latex is compounded with vulcanization ingredients without the need for coagulation of said latex, and then vulcanized, which comprises compounding with a latex, prepared by maintaining a monomeric material comprising a conjugated diene in aqueous emulsion containing from 15 to not more than 40 parts by weight of water per 100 parts by weight of said monomeric material, under polymerization conditions for producing a synthetic rubber latex, whereby a synthetic rubber paste latex is produced, said latex having a solids content of at least 70 weight percent; ingredients for rendering unvulcanized synthetic rubber in condition for vulcanization; drying the resulting compounded latex and, vulcanizing the compounded latex in its resulting dried form; and recovering vulcanizate so produced.

13. The process of claim 12 wherein a portion of the said compounding ingredients is added to the said latex prior to said drying, and the remaining portion of said ingredients is added to the dried latex by milling.

14. The process of claim 12 wherein prior to said drying, the compounded paste latex is sheeted by milling.

15. The process of claim 12 wherein said compounding ingredients are added as a single admixture.

16. The process of claim 12 wherein said compounding ingredients are added separately to said latex.

17. The improvement of claim 1 wherein not more than 25 parts by weight of water is contained in said emulsion.

18. In the production of a synthetic rubber latex by the polymerization in aqueous emulsion of a monomeric material comprising a conjugated diene, the improvement comprising incorporating a sufficient amount of water in said emulsion to maintain said polymerization in a continuous aqueous phase, and not more than 40 parts by weight of water in said emulsion per 100 parts by weight of said monomeric material charged, whereby a synthetic rubber paste latex is formed, said paste latex having a solids content of at least 70 weight percent and being suitable for vulcanization without requiring process steps for first effecting coagulation of same to produce polymer crumb with subsequent separation and drying of said crumb.

19. A process for the production of a synthetic rubber vulcanizate, wherein a synthetic rubber latex is prepared and compounded with vulcanization ingredients without the need for coagulation of said latex, comprising maintaining a monomeric material comprising a conjugated diene in aqueous emulsion containing from 15 to not more than 40 parts by weight of water per 100 parts by weight of said monomeric material, under polymerization conditions for producing a synthetic rubber latex, latex thus formed being a paste and having a solids content of at least 70 weight percent; incorporating into said paste latex in its form as produced, compounding ingredients for rendering unvulcanized synthetic rubber in condition for vulcanization; drying the resulting compounded latex and, completely vulcanizing the compounded latex in its resulting form; and recovering vulcanizate so produced.

20. In the production of a synthetic rubber latex by the polymerization in aqueous emulsion of a monomeric material comprising a conjugated diene, the improvement comprising introducing the emulsifier into the polymerization system during a single emulsifier-addition period, maintaining from 15 to not more than 40 parts by weight of water in said emulsion per 100 parts by weight of said monomeric material charged, resulting latex being a paste and having a solids content of at least 70 weight percent, and recovering said paste latex as a product of the process.

21. A synthetic rubber paste latex produced by polymerization of a monomeric material comprising a conjugated diene, in aqueous emulsion containing from 15 to not more than 40 parts by weight of water per 100 parts by weight of said monomeric material, said latex having a solids content of at least 70 weight percent and being suitable for vulcanization without requiring coagulation.

22. A synthetic rubber paste latex produced by polymerization of a monomeric material comprising a conjugated diene, in an aqueous emulsion at a pH of from 9 to 12, containing a modifier and from 15 to not more than 40 parts by weight of water per 100 parts by weight of said monomeric material, said latex having a solids content of at least 70 weight percent and being suitable for vulcanization without requiring coagulation.

23. In the production of synthetic rubber latex by the polymerization in aqueous emulsion of a monomeric material comprising a conjugated diene, the improvement comprising maintaining said emulsion at a pH of from 9 to 12 and containing a modifier and from 15 to not more than 40 parts by weight of water per 100 parts by weight of said monomeric material, whereby a paste latex is formed which is suitable for vulcanization without requiring coagulation, the said latex having a solids content of at least 70 weight percent, and recovering paste latex thus formed as a product of the process.

24. A product of vulcanization of a synthetic paste latex produced in accordance with the process of claim 19.

References Cited in the file of this patent

UNITED STATES PATENTS

| | | |
|---|---|---|
| 2,501,692 | Reynolds et al. | Mar. 28, 1950 |
| 2,569,480 | Lorand | Oct. 2, 1951 |
| 2,579,908 | Davison et al. | Dec. 25, 1951 |
| 2,610,163 | Te Grotenhuis | Sept. 9, 1952 |

FOREIGN PATENTS

| | | |
|---|---|---|
| 304,207 | Great Britain | Apr. 15, 1930 |